United States Patent
Cossette et al.

(10) Patent No.: US 11,832,559 B2
(45) Date of Patent: Dec. 5, 2023

(54) CELLULOSE FILAMENT MEDIUM FOR GROWING PLANT SEEDLINGS

(71) Applicant: Kruger Inc., Montreal (CA)

(72) Inventors: Maxime Cossette, Pointe-Claire (CA); Joëlle Berthier, Montreal (CA); Robert Brassard, Trois-Riveres (CA); Helen Lentzakis, Ville St Laurent (CA)

(73) Assignee: KRUGER INC., Montreal (CA)

( * ) Notice: Subject to any disclaimer, the term of this patent is extended or adjusted under 35 U.S.C. 154(b) by 102 days.

(21) Appl. No.: 16/870,951

(22) Filed: May 9, 2020

(65) Prior Publication Data

US 2021/0227759 A1    Jul. 29, 2021

Related U.S. Application Data

(60) Provisional application No. 62/966,269, filed on Jan. 27, 2020.

(51) Int. Cl.
*A01G 24/22*    (2018.01)
*A01G 31/02*    (2006.01)

(52) U.S. Cl.
CPC ............. *A01G 24/22* (2018.02); *A01G 31/02* (2013.01)

(58) Field of Classification Search
CPC ........ A01G 24/00; A01G 24/20; A01G 24/22; A01G 24/23; A01G 24/25; A01G 24/27; A01G 24/28
(Continued)

(56) References Cited

U.S. PATENT DOCUMENTS

| 8,807,870 B2 | 8/2014 | Laukkanen et al. |
| 9,051,684 B2 | 6/2015 | Hua et al. |

(Continued)

FOREIGN PATENT DOCUMENTS

| CA | 3051410 A1 | 8/2018 | |
| CN | 107409680 A * | 12/2017 | ........... A01G 17/005 |

(Continued)

OTHER PUBLICATIONS https://www.croplife.com/crop-inputs/micronutrients/the-role-of-gypsum-in-agriculture-5-key-benefits-you-should-know/, Apr. 2013 (Year: 2013).*

(Continued)

*Primary Examiner* — Peter M Poon
*Assistant Examiner* — Danielle A Clerkley

(57) ABSTRACT

Cellulose filament medium for growing plant seedlings, comprising mixture of water and cellulose filaments, the cellulose filaments being at a consistency of between about 4% and 50% in the mixture. Composition of matter suitable for forming a cellulose filament medium for growing plant seedlings, comprising: mixture of water and cellulose filaments, the cellulose filaments being at a consistency of between about 28% and 35% in the mixture. Method of forming a medium for growing plant seedlings, comprising: adding a sufficient amount of water to a mixture of water and cellulose filaments, the cellulose filaments being at a consistency of between about 28% and 35% in the mixture, to lower the consistency to between about 14% to 27%. Method of growing plant seedlings comprising: implanting plant seeds in a mixture of water and cellulose filaments, the cellulose filaments being at a consistency of between about 4% and 50% in the mixture.

12 Claims, 6 Drawing Sheets

(58) Field of Classification Search
USPC .................................. 47/58.1 SE, 62 N, 59 S
See application file for complete search history.

(56) References Cited

U.S. PATENT DOCUMENTS

| | | |
|---|---|---|
| 9,803,320 B2 | 10/2017 | Dorris et al. |
| 9,856,607 B2 | 1/2018 | Hua et al. |
| 10,011,528 B2 | 7/2018 | Dorris et al. |
| 10,087,580 B2 | 10/2018 | Ben et al. |
| 2006/0231451 A1 | 10/2006 | Takeda et al. |
| 2011/0120005 A1 | 5/2011 | King et al. |
| 2016/0219810 A1 | 8/2016 | Erkkila et al. |
| 2017/0150749 A1 | 6/2017 | Ben et al. |
| 2017/0282467 A1 | 10/2017 | Dorris et al. |
| 2018/0073194 A1 | 3/2018 | Hua et al. |
| 2018/0264386 A1 | 9/2018 | Dralet et al. |
| 2019/0224929 A1 | 7/2019 | Outlanti et al. |

FOREIGN PATENT DOCUMENTS

| | | |
|---|---|---|
| WO | 2017/219127 A1 | 12/2017 |
| WO | 2018/049522 A1 | 3/2018 |
| WO | 2018/187841 A1 | 10/2018 |
| WO | 2018/209444 A1 | 11/2018 |
| WO | 2018/232500 A1 | 12/2018 |
| WO | 2019/018922 A1 | 1/2019 |

OTHER PUBLICATIONS

Canadian Examiner's Report ( CA 3,080,549).
Office Action dated Nov. 23, 2020 in U.S. Appl. No. 17/014,964.

\* cited by examiner

CELLULOSE FILAMENT MEDIUM FOR GROWING PLANT SEEDLINGS

CROSS-REFERENCE

The present application claims priority to U.S. Provisional Application No. 62/966,269, filed Jan. 27, 2020, entitled "Soilless Cellulosic Growth Medium for Plant Seeds", the entirety of which is incorporated by reference herein.

FIELD

The present technology relates to cellulose filament growth media for plant seedlings.

BACKGROUND

Cellulose is an organic compound with the formula $(C_6H_{10}O_5)_n$, a polysaccharide consisting of a linear chain of several hundred to many thousands of $\beta(1\rightarrow 4)$ linked D-glucose units. Cellulose is an important structural component of the primary cell wall of green plants and other life forms, such as algae. Some species of bacteria secrete cellulose to form biofilms. Cellulose is the most abundant organic polymer on Earth. The cellulose content of cotton fiber is 90%, that of wood is 40-50%, and that of dried hemp is approximately 57%.

Cellulose is mainly used industrially to produce paperboard and paper. Smaller quantities are converted into a wide variety of derivative products such as cellophane and rayon. Conversion of cellulose from energy crops into biofuels such as cellulosic ethanol is under development as a renewable fuel source. Cellulose for industrial use is mainly obtained from wood pulp and cotton.

Traditionally, mechanically and/or chemically produced pulp fibers from wood and other plants were the principal source material for cellulosic products. A single such fiber is made up of linear long polymer chains of cellulose embedded in a matrix of lignin and hemicellulose. The cellulose content depends on the source of fiber as well as the pulping process used to extract fibers, varying from 40 to almost 100% for fibers made from wood and some plants like kenaf, hemp, and cotton.

To make paper for example, at a very high level, a dilute suspension of separate pulp fibers in water is drained through a sieve-like screen, so that a mat of randomly interwoven fibers is laid down. Water is further removed from this sheet by pressing, sometimes aided by suction or vacuum, or heating. Once dry, a generally flat, uniform and strong sheet of paper is achieved.

Because cellulosic pulp fiber is a renewable resource, and given the decrease in the production of paper and publication paper products over time and particularly over the past two decades, research into new uses for cellulose has been ongoing. As part of this research, new different types of cellulosic materials have been produced. Such materials include, but are not limited to: microfibrillated cellulose (MFC), crystalline nanocellulose (CNC), super microfibrillated cellulose, nanocellulose, cellulose microfibrils, cellulose nanofibrils, nanofibers, nanocellulose, microcrystalline cellulose (MCC), microdenominated cellulose (MDC), etc. All of which are described in the prior art. All of these different cellulosic materials have different properties and characteristics.

Another such type of newer cellulosic materials that was recently created is what is now known as the "cellulose filament", sometimes simply "CF". (Cellulose filaments were originally known as "cellulose nanofilaments" but are generally no longer referred to by that name.) Cellulose filaments were first described in United States Patent Application Publication No. US 2011/0277947 A1 (Hua et al.), published on Nov. 17, 2011, entitled "Cellulose Nanofilaments and Method to Produce Same" (the "US '947 Publication"), now U.S. Pat. No. 9,856,607 B2. Additional primary description of cellulosic filaments is found in United States Patent Application Publication No. US 2013/0017394 A1 (Hua et al.), published on Jan. 17, 2013, entitled "High Aspect Ration Cellulose Nanofilaments and Method for Their Production" (the "US '394 Publication"), now U.S. Pat. No. 9,051,684 B2; and in United States Patent Application Publication No. US 2015/0275433 A1 (Dorris et al.), published on Oct. 1, 2015, entitled "Dry Cellulose Filaments and the Method of Making the Same" (the "US '433 Publication"), now U.S. Pat. No. 9,803,320 B2. The US '947 Publication, the US '394 Publication, and the US '433 Publication, as well as the patents issuing therefrom, are each incorporated by reference herein in their entireties.

The US '947 Publication was the first description of cellulose filaments and a method of manufacture thereof in the patent literature. In the specification of the US '947 Publication are described characteristics, properties and uses of cellulose filaments. The US '947 Publication teaches that cellulose filaments could be used during the papermaking process to improve both the wet-web strength and the dry sheet strength (as opposed to then prior additives which did not affect the wet-web strength). The US '947 Publication further teaches that cellulose filaments could be used for reinforcement of paper and paperboard products and composite materials and that they could be used to produce superabsorbent materials. (See, for example, the abstract of the US '947 Publication.)

The US '394 Publication followed the US '947 Publication. The US '394 Publication improved on the US '947 Publication in disclosing a method to produce high aspect ratio cellulose filaments from lignocellulosic fibres on a commercial scale (being seemingly allegedly an improvement over the method disclosed in the US '947 Publication). According to the US '394 Publication, cellulose filaments are extraordinarily efficient for reinforcement of paper, tissue, paperboard, packaging, plastic composite products, and coating films. (See, for example, the abstract of the '394 Publication.)

The US '433 Publication followed the US '394 Publication. The US '433 Publication describes an issue with cellulosic materials, including cellulose filaments, known as "hornification". Hornification occurs when cellulosic materials are dried and produce a dried product that cannot be re-dispersed into water, a water-based solution or a water-based suspension. A hornified cellulosic material thus can no longer be used to as a reinforcing material in the papermaking process, for example, as it will not disperse into the pulp fiber suspension. The US '433 Publication describes that the then prior art taught that hornification could be reduced with other types of cellulosic materials (e.g., MFC, NFC) via the addition of chemical additives while drying or via derivatizing the cellulosic material. (Derivatizing in this context is the chemical modification of the glucose molecules being the monomer of the cellulose polymer; e.g., via carboxylation.) However, the US '433 Publication states that both of these approaches have their drawbacks.

The US '433 Publication describes that the production of cellulose filaments (seemingly in the then prior art; i.e., the US '947 Publication and the US '394 Publication) occurs in suspension with water at a consistency up to 60%. (Consistency is the weight percentage of a cellulosic material in a mixture of the cellulosic material and water.) Although it would be desirable to have dried cellulose filaments (as they have a longer shelf life and are less expensive to ship), hornification occurs with this material as well. The US '433 Publication teaches that hornification of cellulose filaments can be substantially reduced without using chemical additives or derivatization via the use of a particular process involving fast vacuum dewatering, pressing and heat drying on papermaking machine.

Later patent documents (i.e., those published after the US '947 Publication, the US '394 Publication, and the US '433 Publication), focused mainly on the various uses that could be made of cellulosic filaments.

United States Patent Application Publication No. US 2018/0264386 A1 (Drolet et al.), published on Sep. 20, 2018, entitled "Filter Media Comprising Cellulose Filaments" (the US '386 Publication) describes the use of cellulose filaments in filters for use in filtering gas or liquids. The US '386 Publication teaches that when a filter has a filter media that has conventional base fibers with various amounts of cellulose filaments, "the filaments can contribute substantially to both filtration efficiency and mechanical properties". (See para. [0015].) In terms of "mechanical properties", for example, the tensile strength of the filter media may be improved. (See para. [0302].)

United States Patent Application Publication No. US 2016/0102018 A1 (Dorris et al.), published on Apr. 14, 2016, entitled "Compositions, Panels and Sheets Comprising Mineral Fillers and Methods to Produce the Same" (the US '018 Publication), now U.S. Pat. No. 10,011,528 B2, describes the use of cellulose filaments in certain gypsum products such as panels, sheets and multi-layer sheets. The US '018 teaches that when those gypsum products are made with cellulose filaments, e.g., cellulose filaments having been added to the aqueous suspension of $CaSO_4 \cdot 2H_2O$ (gypsum crystals) used to make those products, those products are "strengthened" or "reinforced". (See, for example, the abstract.)

United States Patent Application Publication No. US 2016/0319482 A1 (Ben et al.), published on Nov. 3, 2016, entitled "Dry Mixed Re-Dispersible Cellulose Filament/Carrier Product and the Method of Making the Same" (the US '583 Publication), now U.S. Pat. No. 10,087,580 B2, describes a process of producing a dry mixed product of cellulose filaments and a carrier fiber (such as wood or plant pulp) that is redispersible in water. (See, for example, the abstract.)

International Patent Application Publication No. WO 2017/219127 A1 (Hamad, et al.), published on Dec. 28, 2017, entitled "Cellulose Filament-Stablished Pickering Emulsions" (the WO '127 Publication), describes the use of cellulose filaments to stabilize Pickering Emulsions. (A Pickering emulsion is a two-phase emulsion that is stabilized by solid particles.) (See, for example, the abstract.)

United States Patent Application Publication No. US 2017/0150749 A1 (Ben et al.), published on Jun. 1, 2017, entitled "Structurally Enhanced Agricultural Material Sheets and the Method of Producing the Same" (the US '749 Publication) describes the use of cellulose filaments to structurally enhance certain products made from agricultural products. The US '749 Publication teaches that sheets may be made from agricultural products akin to the way that paper is made from wood. Among the examples provided in the US '749 Patent are Nori (traditional Japanese seaweed sheets used to wrap sushi), tobacco sheets (e.g. reconstituted tobacco leaf), and seed paper. (See the "Background of the Invention" section of the specification.) The US '749 Publication further teaches that adding cellulose filaments or cellulose filament containing cellulose fibers to a slurry of the agricultural material will increase the wet-web strength of the resultant wet web during the sheet making process. (See, for example, para. [0016].)

United States Patent Application Publication No. US 2018/0073194 A1 (Hua et al.), published Mar. 15, 2018, entitled "Method of Producing Cellulose Filaments with Less Refining Energy" (the US '194 Publication) describes a method as per its title. As per its abstract, the US '194 Publication teach that the cellulose filaments produced by the method "can be used as a superior reinforcement additive in the production of paper, tissue or paperboard and in the production of plastic composites. It can also be used as a viscosity or rheology modifier in food products, coatings or drilling muds. The [cellulose filaments] produced can also be used to make strong films for application in packaging and in composites."

International Patent Application Publication No. WO 2018/049522 A1 (Laleg et al.), published Mar. 22, 2018, entitled "Method of Transforming High Consistency Pulp Fibers into Pre-Dispersed Semi-Dry and Dry Fibrous Materials" (the 'WO 522 Publication) describes a method as per its title. The 'WO 522 Publication teaches that "the dispersible semi-dry and dry fibrous materials of the compressed bales, webs or diced web pellets [may be] tailored with specific functional properties appropriate for efficient applications in paper, paperboard, packaging, tissue and towel; foamed products, fiber board products, thermoset and thermoplastic composites; cement, concrete and gypsum products; and oil spill cleaning, absorbent core of diapers, personal care products and other uses." (See para. [00101].)

International Patent Application Publication No. WO 2018/232500 A1 (Chtourou), published Dec. 27, 2018, entitled "Method for Producing Thermoplastic Sheet Molding Compounds Reinforced with Cellulosic Filaments and Related Products" (the WO '500 Publication) describes adding cellulose filaments to thermoplastic polymers. The WO '500 Patent teaches that in thermoplastic sheets molded from such mixtures the cellulose filaments act as reinforcement in the composite material formed by the cellulose filaments and the thermoplastic polymers. (See, for example, the abstract).

International Patent Application Publication No. WO 2018/209444 A1 (Cai et al.), published Nov. 22, 2018, entitled "Cellulose Filaments Reinforced Cement Composite Board and Method for the Manufacturing of the Same" (the WO '444 Publication) describes adding cellulose fibers to cement. The WO '444 Publication teaches that cellulose filament reinforced cement boards have a "significantly improved Modulus of Rupture (MOR), wherein the MOR is almost doubled with the addition of 2%-4% [cellulose filament] into the cement board formulation, when compared to a cement board produced with conventional cellulose fibers." (See para. [0072].)

United States Patent Application Publication No. US 2017/0282467 A1 (Dorris et al.), published Oct. 5, 2017, entitled "Composite Materials Comprising Cellulose Filaments and Fillers and Methods for the Preparation Thereof" (the US '467 Publication) describes creating a composite material of a resin, fillers, cellulose filaments and reinforcing fibers. The US '467 Publication teaches that the cellulose filaments will act as a binder to bind the fillers and the reinforcing fibers together. This allows for high filler loading than is the case with conventional such composite materials.

This also allows for good resin impregnation without any dry or unevenly impregnated spots in the final composite. (See para. [0057]-[0062].)

United States Patent Application Publication No. US 2019/0224929 A1 (Outlanti et al.), published Jul. 25, 2019, entitled "Wood Pulp Fiber- or Cellulose Filament-Reinforced Bulk Molding Compounds, Composites, Compositions and Methods for Preparation Thereof" (the US '929 Publication) describes compounds as per its title. "Bulk molding compound (BMC) is a ready to mold material, mainly a glass fiber-reinforced polyester resin material primarily used in injection molding, transfer molding and compression molding. The BMC consists of a mixture of resin, fibers, fillers, thickening agent and other additives." (See para. [0003].) The US '929 Publication teaches that the substitution of cellulose filaments for the glass fiber as reinforcement is beneficial for a variety of reasons. (See para. [0006].)

International Patent Application Publication No. WO 2019/018922 A1 (Diallo et al.), published Jan. 31, 2019, entitled "Systems and Methods to Produce Treated Cellulose Filaments and Thermoplastic Composite Materials Comprising Treated Cellulose Filaments" (the WO '922 Publication) describes systems and method as per its title. The WO '922 Publication teaches a method of treating cellulose filaments with a debonder. The WO '922 Publication further teaches that the treated cellulose filaments can then be associated with a thermopolymer (e.g., polyurethane, polypropylene, etc.) to form a composite material in which the cellulose filaments act to enhance the mechanical properties of the thermopolymer. (See, for example, the abstract.) For example, the "composite material may have a Young's Modulus gain of 181% compared to the thermoplastic polymer alone. The composite material may have a tensile stress gain of 73% compared to the thermoplastic polymer alone." (See para. [0033].)

In summary, the common theme throughout these documents is that a primary characteristic of cellulose filaments is their ability to bind to other materials and produce a "stronger" or "reinforced" resultant composite material (as compared with the starting material on its own). Thus, the primary use of cellulose filaments described in these documents is as a "reinforcement" to other materials.

As noted above, the US '749 Publication describes the use of cellulose filaments to structurally enhance certain products made from agricultural products. One of the examples of such products is seed paper. Seed paper (also conventionally known as "plantable paper") is biodegradable paper that is made with seeds embedded therein. The seeds themselves can still germinate after the papermaking process and they can sprout when the paper is planted in soil and watered. So, for example, the paper can be planted in a household pot of soil, the seeds will grow, and the paper compost will away. All that will be left behind will be flowers, herbs or vegetables, and no waste.

Seed paper need not be solely utilitarian, it can be otherwise useful and/or decorative. For example, seed paper can be used as stationery, cards, invitations, and for decorative wraps. Further, a wide variety of flower, vegetable, and tree seeds can be used in seed paper for decorative effect. The seeds and flowers in the paper can also create decorative effects and colors. Depending on the type of seed and the process used, different colors, thickness, and patterns can be created from the plants that will grow. Seed papers, being paper, are composed of wood-pulp derived cellulose fibers. As was noted above, soil and water are required in order for the plant seeds therein to sprout and grow.

Notwithstanding the existence of seed paper, there has recently been an interest in making other types of cellulosic plant growth media, and International Patent Application Publication No. WO 2018/187841 A1 (Cass), published Oct. 18, 2018, entitled "Plant Growth Media and Method for Making Same" (the WO '841 Publication) describes a type of cellulosic plant seed growth media.

According to the WO '841 Publication: "Soilless media for seed germination and plant growth are becoming increasingly popular in horticulture due to their ability to control water and nutrient supply as well as the suppression of soil-borne diseases. Unfortunately, most of these substrates are synthetic and/or non-biodegradable which represents a problem for replanting and disposal, or when used for edible plants." (para. [0003])

"Whilst the use of non-synthetic substrates is known, these have been primarily limited to plant-based cellulose materials. However, whilst the water retention capacities of such materials compare favourably to some other types of substrates, they must still be watered frequently, if not continuously". (para. [0004], emphasis added.)

"Microbial cellulose is an organic compound produced by certain types of bacteria. Whilst microbial cellulose has the same molecular formula as plant cellulose, it has significantly different macromolecular properties and characteristics. One of these characteristics that makes it attractive as a plant growth substrate is its high water retention capacity. However, despite the favorable water retention capacity, the structure of microbial cellulose is too dense to allow for root penetration." (para. [0005], emphasis added.)

"In accordance with the present invention [of the WO '841 Publication], there is provided a method for producing plant growth medium, the method comprising: subjecting a wet microbial cellulose material to a homogenisation process, thereby producing a pulp suitable as a plant growth media." (para. [0008].)

"The wet microbial cellulose is produced by the bacteria as a three-dimensional matrix of microbial cellulose fibrils. This matrix forms as a dense mat, resulting in a gelatinous membrane-like morphology. Whilst seed germination on unprocessed wet microbial cellulose is possible, the inventors have determined that following germination, the roots are unable to penetrate the dense network of fibrils. The roots are therefore unable to take full advantage of water held within the microbial cellulose structure. The inventors [of the WO '841 Publication] have discovered that reducing the particle size of the microbial cellulose allows for penetration of plant roots, while retaining water retention properties required for suitability as a plant growth medium. Without wishing to be bound by theory, it is understood that the particle size reduction of the present invention [of the WO '841 Publication] at least partially break up the dense three-dimensional matrix of microbial cellulose fibrils. Advantageously, unlike the dense network of the unprocessed microbial cellulose, the roots of the plant seed are able to penetrate the pulp and gain the structural support of a properly developing root system. It has been found that subjecting the wet microbial cellulose to a homogenising process reduces the particle size of the microbial cellulose within a particular narrow range. It is understood by the inventors [of the WO '841 Publication] that this reduction in particle size has been found to allow the microbial cellulose pulp to be suitable as a plant growth media." (para. [0014].)

SUMMARY

Thus, taking the teachings of all of the cellulose filament patent documents described herein above as well as the teachings of the WO '841 Publication together, one would expect that cellulose filaments would not be useful in forming a cellulose filament medium for growing plant seedlings. This would be the case for at least a few reasons.

One, the WO '841 Publication teaches that plant-derived cellulose materials must be watered frequently, if not continuously. Because of this, the WO '841 Publication teaches that microbial-derived cellulose materials should be used as they do not suffer from the same drawback. Thus, the WO '841 Publication teaches that cellulose filaments, being plant-derived cellulose materials, should not be used as plant seedling growth media.

Second, the WO '841 Publication teaches that (microbial) cellulose that is too dense to allow for growing plant seed root penetration cannot be used as a plant seedling growth medium. However, one of the primary characteristics of cellulose filaments is their ability to bind to other materials and produce a "stronger" or "reinforced" resultant composite material. A stronger or reinforced material is the opposite of what WO '841 Publication teaches is needed to form a plant seed growth medium, since the "stronger" or more "reinforced" the material is, the more difficult it will be for growing plant seeding's root structure penetration to occur.

Finally, and notwithstanding the teachings of the WO '841 Publication, it is not believed that microbial cellulose would form an appropriate medium for growing plant seedlings. As the skilled addressee would be aware, microbial cellulose is natively much more crystalline in structure than is plant cellulose. The "homogenization process" referred to in the WO '841 Publication would break up the crystals into smaller particles, but their high degree of crystallinity (as compared with plant cellulose) would still be preserved. This has an effect on the degree of structural reinforcement and thus the penetrability of the growing root structures of plant seedlings. Because of this, and for other reasons (e.g., the relatively large particle size, small amount of space between particles, etc.), microbial cellulose does not make an adequate growth medium for growing plant seedlings.

Nonetheless, the developers of the present technology have found cellulose filaments having a particular consistency (as is described below) do provide a good medium for growing plant seedlings, at least, to the stage at which they are ready to be harvested as microgreens. Such cellulose filaments do not need to be constantly watered. In fact, in some instances they do not need to be watered at all. Further, plant root structures are able to penetrate the cellulose filaments.

Microgreens are vegetable greens harvested just after the cotyledon leaves have developed (and possibly with one or more sets of true leaves). They are grown or purchased by people focused on nutrition, or else are used as both a visual and flavor component, primarily in fine dining restaurants. Chefs use colorful microgreens to enhance the attractiveness and taste of their dishes with distinct delicate textures and unique flavors, such as sweet and spicy. Microgreens are smaller than "baby greens" (e.g., spinach, kale, arugula, radicchio (although these varieties can be harvested as microgreens as well)). Among upscale grocers, they are now considered a specialty genre of greens, good for garnishing salads, soups, sandwiches, and plates.

Microgreens (edible young greens) are produced from various kinds of vegetables, herbs, or other plants. They usually range in size from about 1 to 3 inches (2.5 to 7.6 cm), including the stem and leaves, although some varieties can be outside this range. The stem is cut just above the soil line during harvesting. Microgreens have fully developed cotyledon leaves and usually one pair of very small, partially developed true leaves (although they can have more or less). The average crop-time for most microgreens is 10-14 days from seeding to harvest.

Without wishing to be bound by any particular theory, the developers of the present technology have found that cellulose filaments (in the consistencies described herein) seem to have good characteristics (e.g., pH, water retention capacity, water release rate, density, structure, sterility, etc.) to form a growth medium for growing plant seedlings. As an example, the pH of cellulose filaments produced by the process described in the US '947 Publication naturally have a pH of between about 5.7 and 6.9. This matches with the pH of about 5.5 to 6.5 required for most plant seedling growth.

Further, and again without wishing to be bound by any particular theory, the structure of cellulose filaments (in the consistencies described herein) seems to be well adapted for forming plant seedling growth media. Cellulose filaments will create a 3-dimensional network when the percolation threshold (i.e., when the consistency of the cellulose filaments is high enough). When this percolation threshold is reached, the viscosity of the cellulose filaments will increase significantly, and significant reinforcement will be achieved. Moreover, the presence of cellulose filaments will also lead to an increased hydration of the plant since the cellulose filaments absorb water through hydrogen bonding and once saturated, they gradually release the water to the plant before self-desiccation of the plant takes place. As well, by varying the refining energy during the manufacturing process (described in the US '947 Publication), the degree of fibrillation of the cellulose filaments, and thus the degree of strength, reinforcement and water retention of the cellulose filaments, can be varied.

Thus in one aspect, embodiments of the present technology provide a cellulose filament medium for growing plant seedlings, comprising: a mixture of water and cellulose filaments, the cellulose filaments being at a consistency of between about 4% and 50% in the mixture. Preferably, the consistency is between about 14% to 33%. More preferably, the consistency is between about 16% to 20%. As will be described in further detail hereinbelow, testing has shown that such a cellulose filament medium is a good medium for growing plant seedlings, at least until the stage that they are ready to be harvested as microgreens.

In the context of the present technology, consistency is the weight percentage of cellulose filaments in a mixture of cellulose filaments and water, excluding the natural base humidity of the cellulose filaments. (The natural base humidity is between 70-69% measured according to ASTM E871-82.)

In some embodiments, the cellulose filaments are untreated. In the context of the present technology, "untreated" includes any type of chemical treatment of the cellulose filaments, apart from their manufacture (e.g., according to the process(es) described in the patents hereinabove), except for the addition of water (be it pure or including substances ordinally dissolved therein, e.g., tap water). For example, chemical treatment for the purposes of drying or derivatization, as are described in the patents hereinabove, would not be "untreated" for present purposes.

It has been found that the addition of nutrients (e.g. nitrogen-, phosphorous-, potassium-, etc. -based compounds) and/or biostimulants is not generally necessary to grow plant seedlings to the stage where they are ready to be harvested as microgreens. (Although, this should not be interpreted as saying such materials could not or should not be added. At present the developers of the present technology take no position in this regard except to note that: (1)

Eventually, owing a lack of nutrients, plant seedling growth, at some point in time beyond when they are ready to be harvested as microgreens, will cease, and the plants will cease to grow, lose their health and/or eventually die. (2) It has been found that cellulose filaments have a very low cation-exchange capacity (mean 8.8896), which means that they have a low capacity to retain several nutrients in plant-available form that plants will need if they are to grow beyond the microgreen state.) In the context of the present disclosure, however, the addition of such materials would not qualify as "untreated".

In some embodiments, the cellulose filaments are unbleached. As the skilled addressee would understand, cellulosic materials can be bleached, semi-bleached, or unbleached; each of these being a term known to those of ordinary skill in the art. (E.g., The term "unbleached" is used to characterize pulp that has not been chemically processed to lower the lignin content, which therefore remains at approximately 2-5%. The term "bleached" is used to characterize pulp that has been chemically processed to lower the lignin content to less than 0.1%.) In the context of the present technology, unbleached cellulose filaments are preferred, as they are less expensive to produce and do not require the use of bleaching agents. Further, the developers have not observed any material effect on the growth of plant seedlings, at least to the microgreen harvesting stage, as a result of the amount of lignin contained in the cellulose filament growth medium.

In some embodiments, there is an absence of soil in the mixture. As has been otherwise discussed herein, the addition of materials, including soil, to a plant growth medium of the present technology is not necessary for plant seedling growth, at least until the stage where they lack oxygen and/or nutrients. The addition of soil may simply complicate the manufacturing process, and may (depending on the material) actually detract from the ability of the mixture to act as growth medium (e.g., other materials do not have the same ability as cellulose filaments to absorb and release water). (Although, this should not be interpreted as saying such materials could not or should not be added. At present the developers of the present technology take no position in this regard.) In the context of the present disclosure, "soil" includes earth for growing plants, materials commonly found in or added to earth for growing plants, and materials used on their own for growing plants. Non-limiting examples include, peat moss, tree bark, coconut fibers, sawdust, etc.

In some embodiments, the cellulose filaments are never-dried cellulose filaments. As was discussed herein above, most drying processes result in hornification. Hornification involves the creation of agglomerations of non-redispersible cellulose filaments, owing to strong hydrogen bonding between the filaments. Cellulose filaments that have a material degree of hornification lose their ability to absorb and release water. (It should be noted however, that the US '433 Publication teaches that hornification of cellulose filaments can be substantially reduced (without using chemical additives or derivatization) via the use of a particular process involving fast vacuum dewatering, pressing and heat drying on papermaking machine. This process could be used to manufacture dried cellulose filaments with reduced levels of hornification; however, at the time of filing of the present specification, the large-scale industrial use of such process for this purpose is cost-prohibitive.)

In some embodiments, the cellulose filaments have an average aspect ratio from about 200 to about 5000, an average width from about 30 nm to about 500 nm, and an average length of about 200 µm to about 2 mm. Without wishing to be bound by any particular theory, it is (1) the high aspect ratio of cellulose filaments, as well as (2) their ability to absorb, retain, and release water, and (3) their ability to become entangled and thus offer an adequate structure on which the roots of a plant seedling can grow, that make cellulose filaments (as described herein) a good growth medium for plant seedlings. (It should be noted that when referring to cellulose filaments, their "width" and "diameter" describe the same measurement; unlike the case for Kraft pulp.)

In some embodiments, the cellulose filaments are derived from at least one of mechanical pulp, chemical pulp or recycled pulp. Non-limiting examples: thermomechanical pulp (TMP) is an example of a mechanical pump; Kraft pulp is an example of a chemical pulp; and OCC (old corrugated cardboard) is an example of recycled pulp. The type of pulp used to manufacture cellulose filaments will affect the properties and characteristics of the cellulose filaments so manufactured. In this respect, the developers of the present technology believe that chemical pulp, and in particular Kraft pulp will produce cellulose filaments most conducive to plant seedling growth as described herein. For example, as compared those made from with Kraft, cellulose filaments made from TMP will likely have a reduced average length and a higher lignin content. This will likely mean that they have a reduced water retention capacity and a weaker structure. This is not to say that cellulose filaments produced from TMP cannot be used to create cellulose filaments in the context of the present technology, only that in many applications, Kraft-derived cellulose filaments will be preferred because of their superior properties and characteristics.

In another aspect, embodiments of the present technology provide a composition of matter suitable for forming a cellulose filament medium for growing plant seedlings, comprising: a mixture of water and cellulose filaments, the cellulose filaments being at a consistency of between about 28% and 35% in the mixture. In many instances, it will be desirable to manufacture cellulose filaments at this higher consistency, ship them from their place of manufacture, and then reduce their consistency (via the addition of water) at a later point in time. This may, depending on the circumstances, facilitate transport and storage, and be more economically efficient.

In some embodiments, the cellulose filaments are untreated. In some such embodiments, the cellulose filaments are unbleached.

In some embodiments, there is an absence of soil in the mixture.

In some embodiments, the cellulose filaments are never-dried cellulose filaments.

In some embodiments, the cellulose filaments have an average aspect ratio from about 200 to about 5000, an average width from about 30 nm to about 500 nm, and an average length of about 200 µm to about 2 mm.

In some embodiments, the cellulose filaments are derived from at least one of mechanical pulp, chemical pulp or recycled pulp.

The descriptions of the above embodiments are similar to those described above in relation to the first aspect of the technology. They are simply not repeated here for the purpose of brevity.

In another aspect, implementations of the present technology provide a method of forming a medium for growing plant seedlings, comprising: adding a sufficient amount of water to a mixture of water and cellulose filaments, the cellulose filaments being at a consistency of between about 28% and 35% in the mixture, to lower the consistency to between about 14% to 27%.

The developers of the present technology believe that a mixer without blades, such as a Formax™ pulper, is a better method of mixing the water into the cellulose filaments. However, mixers with blades (e.g., a commercial blender) can be used for this task as well.

In some implementations, to lower the consistency to between about 14% to 27% is to lower the consistency to between about 16% and 20%.

In some implementations, the cellulose filaments are untreated.

In some implementations, the cellulose filaments are unbleached.

In some implementations, there is an absence of soil in the mixture.

In some implementation, the cellulose filaments are never-dried cellulose filaments.

In some implementations, the cellulose filaments have an average aspect ratio from about 200 to about 5000, an average width from about 30 nm to about 500 nm, and an average length of about 200 µm to about 2 mm.

In some implementations, the cellulose filaments are derived from at least one of mechanical pulp, chemical pulp or recycled pulp.

The descriptions of the above implementations are similar to those described above in relation to the first aspect of the technology. They are simply not repeated here for the purpose of brevity.

In another aspect, implementations of the present technology provide a method of growing plant seedlings comprising: implanting plant seeds in a mixture of water and cellulose filaments, the cellulose filaments being at a consistency of between about 4% and 50% in the mixture.

In some implementations, the consistency is between about 14% to 33%. In some such implementations, the consistency is between about 16% to 20%.

In some implementations, the cellulose filaments are untreated.

In some implementations, the cellulose filaments are unbleached.

In some implementations, there is an absence of soil in the mixture.

In some implementation, the cellulose filaments are never-dried cellulose filaments.

In some implementations, the cellulose filaments have an average aspect ratio from about 200 to about 5000, an average width from about 30 nm to about 500 nm, and an average length of about 200 µm to about 2 mm.

In some implementations, the cellulose filaments are derived from at least one of mechanical pulp, chemical pulp or recycled pulp.

The descriptions of the above implementations are similar to those described above in relation to the first aspect of the technology. They are simply not repeated here for the purpose of brevity.

Embodiments/implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 4:
FIG. 4 shows cellulosic filaments of a consistency of between about 28% and 35% used to make cellulosic filament medium for growing plants, being an embodiment of the present technology.

Referring to FIG. 4, there is shown cellulose filaments being of a consistency of between about 28% and 35%. At this consistency, the cellulose filaments are akin to Play-Doh™ modelling compound. The cellulose filaments shown in FIG. 4 have been made from Northern Bleached Softwood Kraft (NBSK) pulp according to the process described in the US '947 Publication. They have not been dried nor otherwise treated. No other materials have been added. The cellulose filaments have an aspect ratio from about 200 to about 5000, a width from about 30 nm to about 500 nm, and a length of about 200 µm to about 2 mm. (Averages were not calculated.) Samples of this cellulose filament material are available from Kruger Inc. of Montréal, Québec, Canada.

Figure 5:
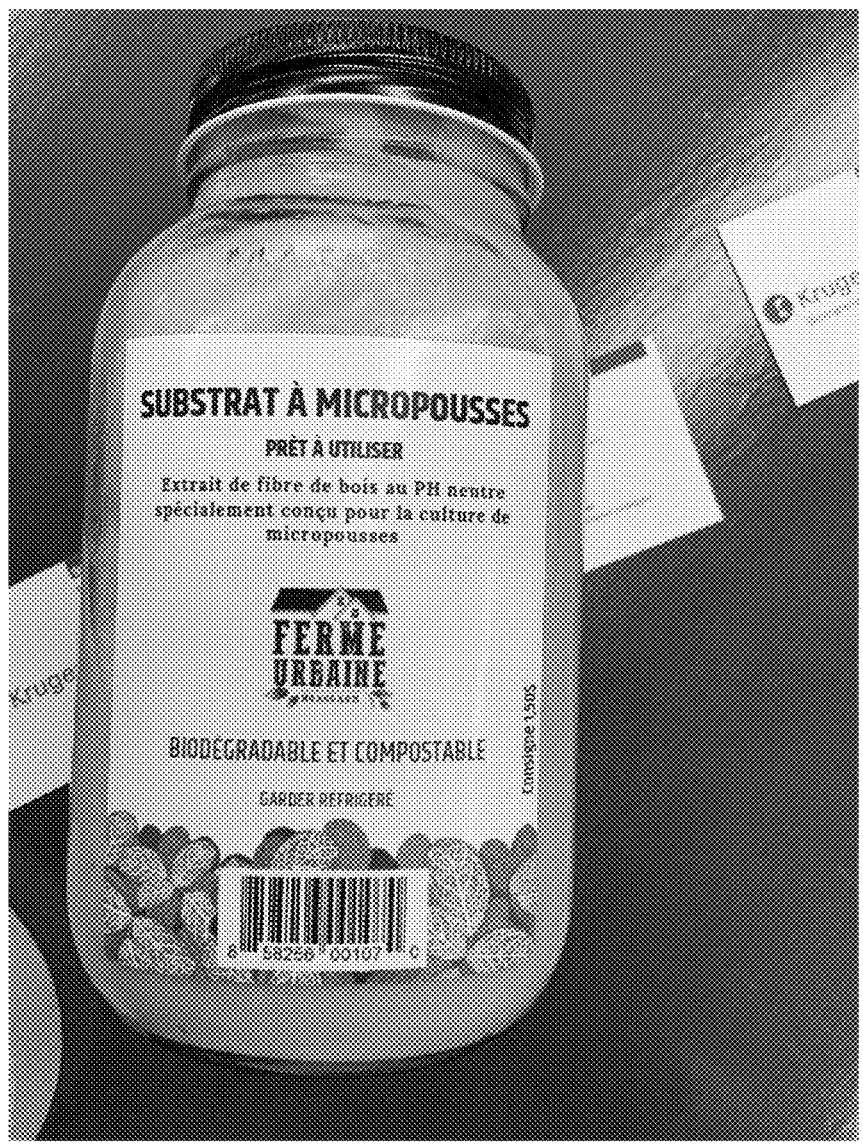
FIG. 5 shows a jar of cellulosic filaments of a consistency of between about 16% and 20% being cellulosic filament medium for growing plants, being an embodiment of the present technology.

Referring to FIG. 5, there is shown cellulose filaments being of a consistency of between about 16% and 20% in a jar. At this consistency, the cellulose filaments are akin to a fine wet cement. The cellulose filaments shown in the jar in FIG. 5 have been made from Northern Unbleached Softwood Kraft pulp according to the process described in the US '947 Publication. During their production, the cellulose filaments were not dried nor otherwise treated. No other materials were added during their production. As the process described in the US '947 Publication produces cellulose filaments at a consistency of between about 28% and 35%, after having been produced by that process, the cellulose filament were placed in a small industrial blender and water was added and mixed in to bring the consistency down to between about 16% and 20%. No other materials were added. The pH of the solution was between about 5.7 and 6.9, which is considered neutral for plant seedling growth purposes. The cellulose filaments have an aspect ratio from about 200 to about 5000, a width from about 30 nm to about 500 nm, and a length of about 200 µm to about 2 mm. (Averages were not calculated.) Samples of this cellulose filament material are available from "Ferme Urbaine Brassard" in Trois-Rivières, Québec, Canada.

Once the cellulose filaments of the desired consistency of between about 16% and 20% were obtained, about a layer of 1 inch was poured into bio-plastic see-through containers, seeds were sprinkled on top of the layer, and a cover was placed on the container. The containers were then left in the dark for a few days (the amount of time depending on the variety of the seeds used—the needs of each plant being typically different), and the seeds germinated. The containers were taken out of the darkness and left in sunlight for several days until the plant seedlings had grown to the point where they could be harvested as microgreens. (Again, this timing varies according to plant type.) The microgreens were then harvested by cutting the plant seedlings at the stem above the seed remnants.

It was found that for most plant varieties, as long as the cover remained on the container, watering the plant seedlings was not necessary. The cellulose filaments provided the growing seedlings with sufficient amounts of water. Without wishing to be bound any particular theory, the water retention capacity of cellulose filaments (5.17±0.1 and 5.68±0.13 (grams of water per gram of dry cellulose filaments) (depending on the refining energy used to make the cellulose filaments) tested with the CPVQ method (field capacity) is higher than the highest result obtained for peat moss (3.9 grams of water per gram of dry cellulose filaments). (Peat moss being a material generally considered to have a high water retention.) (And, as with this method the cellulose filaments are simply watered and not dispersed, it does not represent their true water retention potential. To reach their full potential, the cellulose filaments must be dispersed in water with a mixer without blades (preferably) or a blender. Thus, cellulose filaments (having the consistency noted above) are alone (in the tested cases at least) able to furnish the growing plant seedlings with sufficient amounts of water from them to grow to the stage where they are ready to be harvested as microgreens (when the seedlings are being grown in a covered container).

Figure 6:
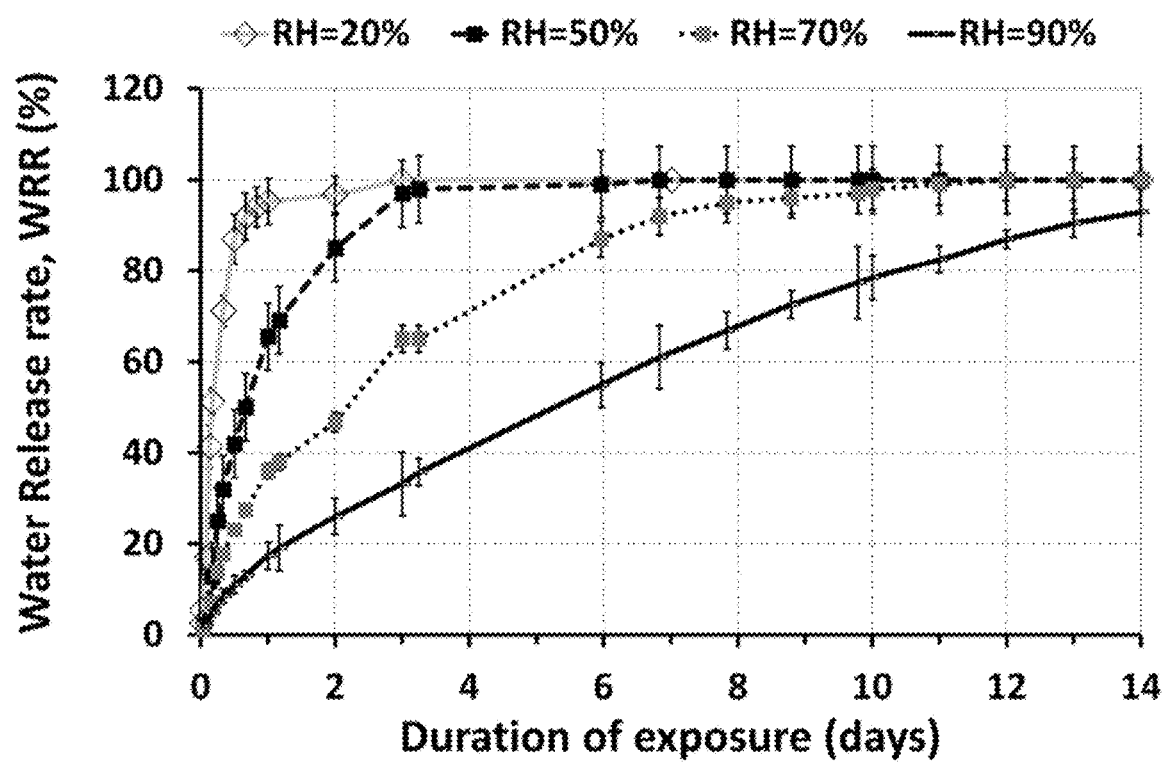
FIG. 6 shows a graph of the water release rate of cellulose filaments.

Further, referring to FIG. 6, there is shown the water release rate of cellulose filaments as a function the duration of exposure of the cellulose filaments at various levels of ambient relative humidity (RH) levels. The figure indicates that irrespective of the ambient relative humidity fully saturated cellulose filaments can release all of their "imbibed" water. The FIG. also shows that the water release rate is fast at lower ambient relative humidity levels but very slow at high ambient relative humidity level. For example, as 20% RH, the cellulose filament releases all its retained water within 6 hours. By contrast, for RH levels of 50%, 70%, and 90%, the plateauing of the water release rate took further time; namely 1, 7, and 14 days, respectively. The observed slow water release rate at higher ambient relative humidity levels can be viewed advantageous since the cellulose filaments release their water over an extended period as the plant needs hydration. Without wishing to be bound by any particular theory, this is beneficial for growing plant seedlings in covered containers to their being ready for harvesting as microgreens, as this process takes approximately 10 days. If the relative humidity in the environment is approximately 80% or above, watering the plant seedlings will not be necessary given the water release rate of the cellulose filaments.

It was also found, however, that if the plant seedlings were grown without the cover being present, then watering the cellulose filaments/seedlings was necessary. Tests showed that they need to be watered at least once a day during the darkness period (described above) and at least 2 times a day during the light period (described above) when they are in an ambient environment of about 20° C., about 85% humidity, and moderate to high breezes. But the watering frequency (without being grown in a covered container) was found to vary greatly and depended on multiple factors (e.g., the environment, the plant type, the number of seed, etc.)

In any case, the cellulose filaments were, and should be, maintained wet for plant seedling growth purposes, as plants need water to live and growth. (Cellulose filaments can dry out during plant growth if not watered enough and/or if, at the end of the growth to the microgreen stage, the plants are kept in the refrigerator for too long.)

The above process was repeated with an array of different plants that are typically consumed as microgreens, including the following:

Dill
Basil
Thai Basil
Swiss Chard
Beet
Bok Choy
Broccoli
Purple Kohlrabi (German Turnip)
Coriander
Fenugreek
Mung Bean
Kale
Alfalfa
Popcorn
Onion
Green Peas
Snow Peas
Red Radish
Pink Radish
Arugula
Buckwheat
Black-eyed Susan (Sunflower)
Red Clover
Wasabi All of the above listed plant seeds grew into plant seedlings and were harvestable as microgreens as described above.

Figure 1:
FIG. 1 shows microgreens growing in a cellulosic filament medium for growing plant seedlings of the present technology.

FIG. 1 shows two different varieties of plant seedlings that have been grown in a cellulose filament growth medium as described above. These plant seedlings are ready for harvesting as microgreens. The plant seedlings in the container on the left in the figure are radish (the container cover has been removed on the uppermost container to better show the plant seedlings). The plant seedlings in the container on the right in the figure are clover (the container cover has been removed on the uppermost container to better show the plant seedlings). Containers similar to these with plant seedlings ready for harvesting are commercially available from "Ferme Urbaine Brassard" in Trois-Rivières, Québec, Canada.

Figure 2:
FIG. 2 shows microgreens growing in a cellulosic filament medium for growing plant seedlings of the present technology.

FIG. 2 shows a different variety of plant seedlings that have been grown in a cellulose filament growth medium as described above; namely, sunflower. These plant seedlings are ready for harvesting as microgreens. The container cover has been removed to better show the plant seedlings. Again, containers such as this one with plant seedlings ready for harvesting are commercially available from "Ferme Urbaine Brassard" in Trois-Rivières, Québec, Canada.

Figure 3:
FIG. 3 shows the root system of microgreens growing in a cellulosic filament medium for growing plants of the present technology.

FIG. 3 shows sunflower seedlings similar to those of FIG. 2. The sunflower seedlings have been lifted together out of the container in which they were being grown. The underside, which can be seen in the figure, is a mesh of the root structures of the various plant seedlings and the cellulose filaments. As can also be seen in the figure, the cellulose filament material does not run or drip, it remains intermeshed with the root structures. The plant roots structures were able to penetrate and grow within the cellulose filament material.

Definitions

Unless otherwise indicated, the definitions and embodiments/implementations described in this and other sections are intended to be applicable to all embodiments, implementations and aspects of the present disclosure herein described for which they are suitable as would be understood by a person skilled in the art.

As used in the present disclosure, the singular forms "a", "an" and "the" include plural references unless the content clearly dictates otherwise. For example, an embodiment including "a component" should be understood to present certain aspects with one component, or two or more additional components.

In embodiments comprising an "additional" or "second" component, such as an additional or second fiber, the second component as used herein is different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about", "approximately" and "similar" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A plant seedlings growing medium, comprising:
a suspension of loose plant-derived cellulose filaments placed in an initial amount of aqueous liquid wherein the cellulose filaments are at a consistency of between about 4% and 50% in the suspension and said growing medium when exposed at an atmosphere of about 70% relative humidity for five days retains at least 50% by weight of said initial aqueous liquid.

2. The plant seedlings growing medium of claim 1, wherein the cellulose filaments are untreated and the aqueous liquid is water.

3. The plant seedlings growing medium of claim 1, wherein the cellulose filaments are unbleached and said growing medium further comprises plant growth additives including plant hormones or plant fertilizers.

4. The plant seedlings growing medium of claim 1 with the proviso that the medium is soil-free.

5. The plant seedlings growing medium of claim 1, wherein the cellulose filaments are never-dried cellulose filaments.

6. The plant seedlings growing medium of claim 1, wherein the cellulose filaments have
an average aspect ratio from about 200 to about 5000,
an average width from about 30 nm to about 500 nm, and
an average length of about 200 μm to about 2 mm.

7. The plant seedlings growing medium of claim 1, wherein the cellulose filaments are at a consistency of between about 14% to 33% in the suspension.

8. The plant seedlings growing medium of claim 1, wherein the cellulose filaments are at a consistency of between about 16% to 20% in the suspension.

9. A method of forming a medium for growing plant seedlings, comprising:
adding water to the plant seedlings growing medium of claim 1 to achieve a suspension of cellulose filaments being at a consistency of between about 14% to 27% in the suspension.

10. The method of forming a medium for growing plant seedlings of claim 9, wherein the cellulose filaments are unbleached.

11. The method of forming a medium for growing plant seedlings of claim 9, wherein the cellulose filaments have
an average aspect ratio from about 200 to about 5000,
an average width from about 30 nm to about 500 nm, and
an average length of about 200 μm to about 2 mm.

12. A method of growing plant seedlings comprising:
implanting plant seeds in the plant seed growing medium of claim 1.

* * * * *